US 6,644,677 B1

(12) United States Patent
Rose

(10) Patent No.: US 6,644,677 B1
(45) Date of Patent: Nov. 11, 2003

(54) ERGONOMIC TANDEM BICYCLE

(76) Inventor: Dana D. Rose, P.O. Box 424, Pearblossom, CA (US) 93553

( * ) Notice: Subject to any disclaimer, the term of this patent is extended or adjusted under 35 U.S.C. 154(b) by 90 days.

(21) Appl. No.: 10/037,872

(22) Filed: Jan. 4, 2002

(51) Int. Cl.[7] .............................................. B62K 17/00
(52) U.S. Cl. ................ 280/288.1; 280/222; 280/226.1; 280/231; 280/273; 280/274; 297/243
(58) Field of Search .......................... 280/29, 200, 210, 280/220, 222, 226.1, 230, 231, 259–261, 263, 270, 273, 274, 281.1, 288.1; 297/195.12, 215.1, 243

(56) References Cited

U.S. PATENT DOCUMENTS

| | | |
|---|---|---|
| 4,283,070 A | 8/1981 | Forrestall et al. |
| 4,527,811 A | 7/1985 | Demoss |
| 4,647,060 A | 3/1987 | Tomkinson |
| 5,201,538 A | 4/1993 | Mayn |
| 5,503,419 A | 4/1996 | Gardner |
| 5,584,494 A | * 12/1996 | Krumm ................... 280/288.1 |
| D393,235 S | 4/1998 | Ullman et al. |

FOREIGN PATENT DOCUMENTS

| | | | | |
|---|---|---|---|---|
| DE | 665251 | * | 9/1938 | ................. 280/273 |
| FR | 882705 | * | 3/1944 | ................. 280/273 |

* cited by examiner

*Primary Examiner*—Kevin Hurley
*Assistant Examiner*—Matt Luby

(57) ABSTRACT

A ergonomic tandem bicycle suitable for riders with some limited physical capabilities. The ergonomic tandem bicycle includes an elongated frame with an angled steering column attached to the front portion that positions the front wheel substantially in front of the frame, and the handlebars towards the rear. A transmission assembly includes the necessary pedal sprockets, along with idler sprockets that maintain continuous contact between the sprockets and the long drive chain required with this type of design. The seat is positioned in such a manner so as to allow the riders to sit in a near vertical position.

20 Claims, 2 Drawing Sheets

ERGONOMIC TANDEM BICYCLE

BACKGROUND OF THE INVENTION

1. Field of the Invention

The present invention relates to ergonomic bicycles and more particularly pertains to a new ergonomic tandem bicycle suitable for riders with some limited physical capabilities.

2. Description of the Prior Art

The use of ergonomic bicycles is known in the prior art. U.S. Pat. No. 5,201,538 describes an ergonomic bicycle or optional tricycle. Another type of ergonomic bicycle is U.S. Pat. No. 4,527,811 that details a seat attachment and steering arrangement for a recumbent bicycle or the like.

While these devices fulfill their respective, particular objectives and requirements, the need remains for a system that includes certain improved features such as an improved transmission system and seat arrangement.

SUMMARY OF THE INVENTION

The present invention meets the needs presented above by incorporating a set of idler gears to ensure continuous contact between the drive chain and the pedal sprockets which is essential when the frame is elongated as which is necessary with this type of design. Also, especially in the case of the tandem version, a seat having two different elevated levels is utilized.

Still yet another object of the present invention is to provide a new ergonomic tandem bicycle that utilizes a uniquely shaped handlebars that allows the driver to reach the hand grips without bending forward.

Even still another object of the present invention is to provide a new ergonomic tandem bicycle in which a single seat version using the same principles could be made.

To this end, the present invention generally comprises an elongated frame with an angled steering column attached to the front portion of the frame that positions the front wheel substantially in front of the frame, and the handlebars towards the rear. A transmission assembly includes the necessary pedal sprockets, along with idler sprockets that maintain continuous contact between the sprockets and the long drive chain required with this type of design. The seat is positioned in such a manner so as to allow the riders to sit in a near vertical position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
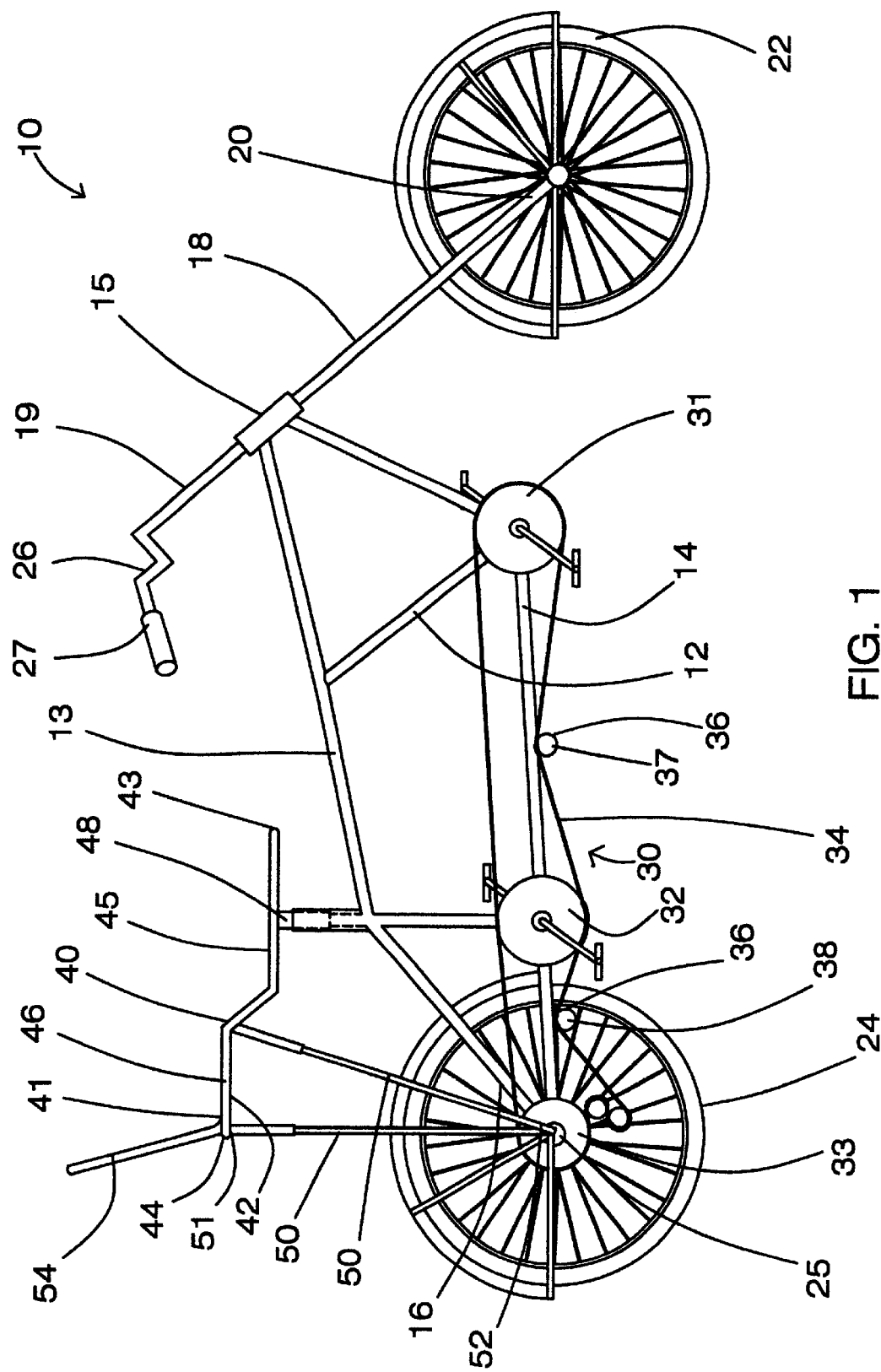
FIG. 1 is a schematic side view of a new ergonomic tandem bicycle according to the present invention.
Figure 2:
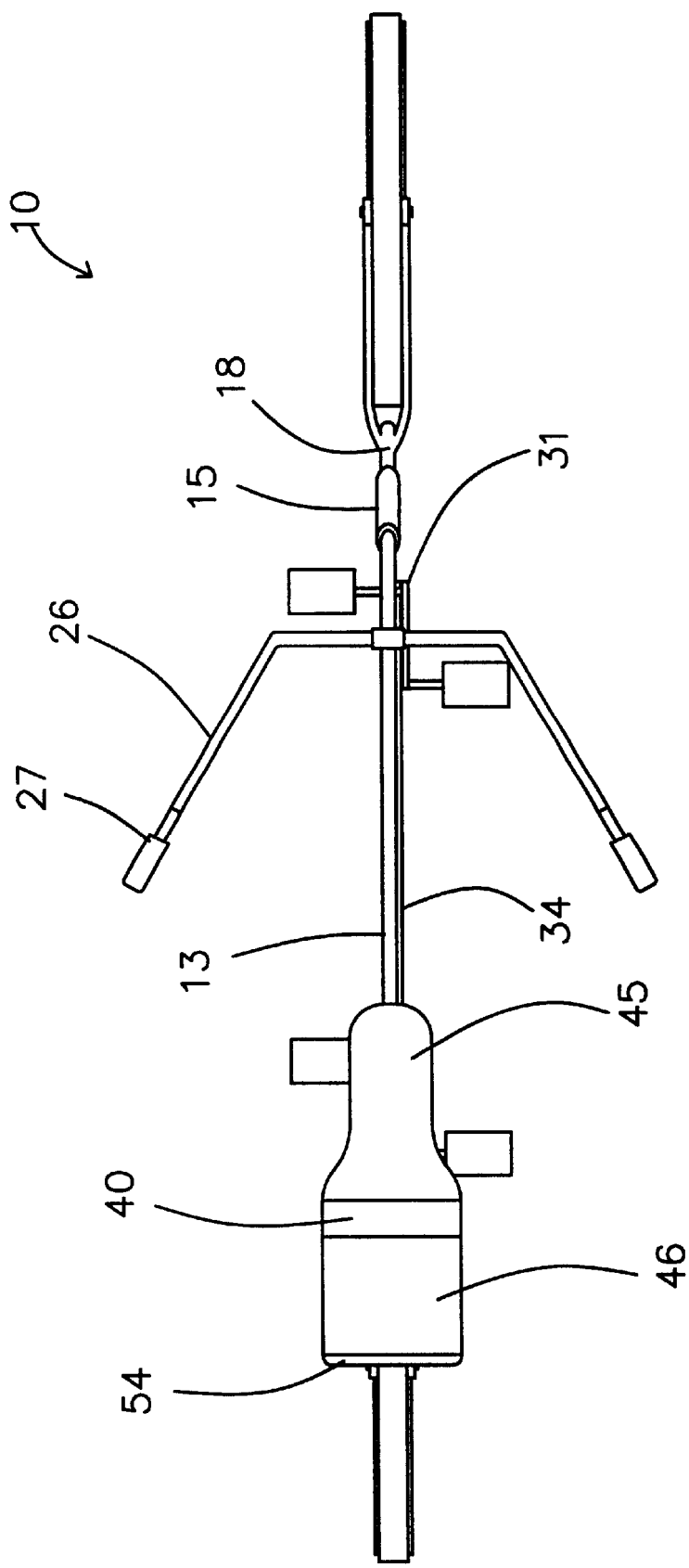
FIG. 2 is a schematic top view of the present invention.

With reference now to the drawings, and in particular to FIGS. 1 and 2 thereof, a new ergonomic tandem bicycle embodying the principles and concepts of the present invention and generally designated by the reference numeral 10 will be described.

As best illustrated in FIGS. 1 and 2, the ergonomic tandem bicycle 10 generally comprises a frame 12. The frame 12 has an upper portion 13 and a lower portion 14. The frame 12 includes a front end 15 and a rear end 16.

A steering column 18 has an upper end 19 and a lower end 20. The steering column 18 is rotatably coupled to the front end 15 of the frame 12 nearer the upper portion 13. The steering column 18 is angled with respect to the frame 12 such that the lower end 20 extends forward away from the upper end 19.

A front wheel 22 is rotatably attached to the lower end 20 of the steering column 18.

A rear wheel 24 includes a rear axle 25 that is rotatably coupled to the frame 12 on the rear end 16 nearer the lower portion 14.

Handlebars 26 for grasping onto by the driver are attached to the upper end 19 of the steering column 18. The handlebars 26 have a plurality of grip portions 27. The handlebars 26 have a gooseneck shape such that the grip portions 27 are lower and rearward of the upper end 19 of the steering column 18.

A transmission assembly 30 for propelling the bicycle is coupled to the lower portion 14 of the frame 12. The transmission assembly 30 includes a front pedal sprocket 31, a rear pedal sprocket 32, and a gear mechanism 33.

The front pedal sprocket 31 is rotatably coupled to the frame 12 on the lower portion 14 nearer the front end 15.

The rear pedal sprocket 32 is rotatably coupled to the frame 12 on the lower portion 14 nearer the rear end 16.

The gear mechanism 33 is coupled to the rear axle 25. Each of the sprockets and the gear mechanism 33 is in a common plane.

An endless drive chain member 34 transfers energy from each of the pedal sprockets 31, 32 to the gear mechanism 33 of the rear wheel 24. The chain member 34 is positioned on and engages the pedal sprockets 31, 32 and the gear mechanism 33.

A plurality of idler gears 36 reduces slack in the chain member 34 and ensures continuous contact with each of the pedal sprockets 31, 32. Each of the idler gears 36 is coupled to the lower portion 14 of the frame 12 and engages the chain member 34. A first of the idler gears 37 is positioned between the pedal sprockets 31, 32. A second of the idler gears 38 is positioned between the rear pedal sprocket 32 and the gear mechanism 33 of the rear wheel 24.

A seat 40 is coupled to the upper portion 13 of the frame 12. The seat 40 has a top surface 41 and a bottom surface 42. The seat 40 has a front edge 43 and a rear edge 44.

A first horizontal portion 45 is positioned adjacent to the front edge 43. A second horizontal portion 46 is positioned adjacent to the rear edge 44.

The first portion 45 is positioned lower relative to the second portion 46. The first portion 45 is positioned substantially behind the front pedal sprocket 31 such that a driver positioned on the first portion 45 assumes a partially recumbent position while riding.

The second portion 46 is positioned substantially behind the rear pedal sprocket 32 such that a rider positioned on the second portion 46 assumes a partially recumbent position while riding.

A post 48 for supporting the first portion 45 of the seat 40 is attached to the bottom surface 42 and is extendable into the frame 12 on the upper portion 13 such that the seat 40 may be raised or lowered with respect to the frame 12. The post 48 is positioned generally above the rear pedal sprocket 32.

A plurality of telescoping rods 50 for supporting the second portion 46 of the seat 40 has top ends 51 and bottom ends 52. Each of the top ends 51 are coupled to the bottom surface 42. Each of the bottom ends 52 are coupled to the frame 12 proximate the rear axle 25.

A backrest 54 for supporting the rider's back while riding is attached to and extends upwardly from the seat 40. The backrest 54 is located adjacent to the rear edge 44 and is generally slanted backwards.

Although the design of the invention centers around a tandem, or two-person bicycle, it is only meant to represent the most complicated version, whereas a single-person version of the invention is obvious with only minor modifications and therefore it should also be considered part of the invention presented.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An ergonomic tandem bicycle suitable for riders with some limited physical capabilities, said bicycle comprising:
    a frame comprising a plurality of interconnected bars, said frame having an upper portion and a lower portion, said frame including a front end and a rear end;
    a steering column having an upper end and a lower end, said steering column being rotatably coupled to said front end of said frame nearer said upper portion,
    a front wheel being rotatably attached to said lower end of said steering column;
    a rear wheel including a rear axle being rotatably coupled to said frame on said rear end nearer said lower portion;
    handlebars for grasping onto by the driver being attached to said upper end of said steering column, said handlebars having a plurality. of grip portions;
    a transmission assembly for propelling the bicycle being coupled to said lower portion of said frame, said transmission assembly including;
        a front pedal sprocket, a rear pedal sprocket, and a gear mechanism;
    an endless drive chain member for transferring energy from each of said pedal sprockets to said gear mechanism of said rear wheel, said chain member being positioned on and engaging said sprockets and said gear mechanism;
    a plurality of idler gears for reducing slack in said chain member and ensuring continuous contact with each of said pedal sprockets, each of said idler gears being coupled to said lower portion of said frame and engaging said chain member;
    a seat being coupled to said upper portion of said frame, said seat having a top surface and a bottom surface, said seat having a front edge and a rear edge, a first horizontal portion being positioned adjacent to said front edge, a second horizontal portion being positioned adjacent to said rear edge;
    a post for supporting said first portion of said seat being attached to said bottom surface and being extendable into said frame on said upper portion such that said seat may be raised or lowered with respect to said frame;
    a plurality of telescoping rods for supporting said second portion of said seat having top ends and a bottom ends, each of said top ends being coupled to said bottom surface, each of said bottom ends being coupled to said frame proximate said rear axle; and
    a backrest for supporting the rider's back while riding being attached to and extending upwardly from said seat, and
    wherein said first portion of said seat being positioned lower relative to said second portion, said first portion being positioned substantially behind said front pedal sprocket such that a driver positioned on said first portion assumes a partially recumbent position while riding.

2. The ergonomic bicycle as set forth in claim 1, wherein said steering column being angled with respect to said frame such that said lower end extends forward away from said upper end.

3. The ergonomic bicycle as set forth in claim 1, wherein said handlebars having a gooseneck shape such that said grip portions are lower and rearward of said upper end of said steering column.

4. The ergonomic bicycle as set forth in claim 1, wherein said front pedal sprocket being rotatably coupled to said frame on said lower portion nearer said front end.

5. The ergonomic bicycle as set forth in claim 1, wherein said rear pedal sprocket being rotatably coupled to said frame on said lower portion nearer said rear end.

6. The ergonomic bicycle as set forth in claim 1, wherein said gear mechanism being coupled to said rear axle.

7. The ergonomic bicycle as set forth in claim 1, wherein each of said sprockets and said gear mechanism being in a common plane.

8. The ergonomic bicycle as set forth in claim 1, further including a first of said idler gears being positioned between said pedal sprockets.

9. The ergonomic bicycle as set forth in claim 1, further including a second of said idler gears being positioned between said rear pedal sprocket and said gear mechanism of said rear wheel.

10. The ergonomic bicycle as set forth in claim 1, wherein said post being positioned generally above said rear pedal sprocket.

11. The ergonomic bicycle as set forth in claim 1, wherein said backrest being located adjacent to said rear edge and being generally slanted backwards.

12. An ergonomic tandem bicycle suitable for riders with some limited physical capabilities, said bicycle comprising:
    a frame comprising a plurality of interconnected bars, said frame having an upper portion and a lower portion, said frame including a front end and a rear end;
    a steering column having an upper end and a lower end, said steering column being rotatably coupled to said front end of said frame nearer said upper portion,
    a front wheel being rotatably attached to said lower end of said steering column;
    a rear wheel including a rear axle being rotatably coupled to said frame on said rear end nearer said lower portion:
    handlebars for grasping onto by the driver being attached to said upper end of said steering column, said handlebars having a plurality of grip portions;

a transmission assembly for propelling the bicycle being coupled to said lower portion of said frame, said transmission assembly including;
  a front pedal sprocket, a rear pedal sprocket, and a gear mechanism;
an endless drive chain member for transferring energy from each of said pedal sprockets to said gear mechanism of said rear wheel, said chain member being positioned on and engaging said sprockets and said gear mechanism;
a plurality of idler gears for reducing slack in said chain member and ensuring continuous contact with each of said pedal sprockets, each of said idler gears being coupled to said lower portion of said frame and engaging said chain member;
a seat being coupled to said upper portion of said frame, said seat having a top surface and a bottom surface, said seat having a front edge and a rear edge, a first horizontal portion being positioned adjacent to said front edge, a second horizontal portion being positioned adjacent to said rear edge;
a post for supporting said first portion of said seat being attached to said bottom surface and being extendable into said frame on said upper portion such that said seat may be raised or lowered with respect to said frame;
a plurality of telescoping rods for supporting said second portion of said seat having top ends and a bottom ends, each of said top ends being coupled to said bottom surface, each of said bottom ends being coupled to said frame proximate said rear axle;
a backrest for supporting the rider's back while riding being attached to and extending upwardly from said seat; and
wherein said second portion being positioned substantially behind said rear pedal sprocket such that a rider positioned on said second portion assumes a partially recumbent position while riding.

13. The ergonomic bicycle as set forth in claim 12, wherein said steering column being angled with respect to said frame such that said lower end extends forward away from said upper end.

14. The ergonomic bicycle as set forth in claim 12, wherein said handlebars having a gooseneck shape such that said grip portions are lower and rearward of said upper end of said steering column.

15. The ergonomic bicycle as set forth in claim 12, wherein each of said sprockets and said gear mechanism being in a common plane.

16. The ergonomic bicycle as set forth in claim 12, further including a first of said idler gears being positioned between said pedal sprockets.

17. The ergonomic bicycle as set forth in claim 12, further including a second of said idler gears being positioned between said rear pedal sprocket and said gear mechanism of said rear wheel.

18. The ergonomic bicycle as set forth in claim 12, wherein said post being positioned generally above said rear pedal sprocket.

19. The ergonomic bicycle as set forth in claim 12, wherein said backrest being located adjacent to said rear edge and being generally slanted backwards.

20. An ergonomic tandem bicycle suitable for riders with some limited physical capabilities, said bicycle comprising:
  a frame comprising a plurality of interconnected bars, said frame having an upper portion and a lower portion, said frame including a front end and a rear end;
  a steering column having an upper end and a lower end, said steering column being rotatably coupled to said front end of said frame nearer said upper portion, said steering column being angled with respect to said frame such that said lower end extends forward away from said upper end;
  a front wheel being rotatably attached to said lower end of said steering column;
  a rear wheel including a rear axle being rotatably coupled to said frame on said rear end nearer said lower portion;
  handlebars for grasping onto by the driver being attached to said upper end of said steering column, said handlebars having a plurality of grip portions, said handlebars having a gooseneck shape such that said grip portions are lower and rearward of said upper end of said steering column;
  a transmission assembly for propelling the bicycle being coupled to said lower portion of said frame, said transmission assembly including;
    a front pedal sprocket, a rear pedal sprocket, and a gear mechanism, said front pedal sprocket being rotatably coupled to said frame on said lower portion nearer said front end, said rear pedal sprocket being rotatably coupled to said frame on said lower portion nearer said rear end, said gear mechanism being coupled to said rear axle, each of said sprockets and said gear mechanism being in a common plane;
  an endless drive chain member for transferring energy from each of said pedal sprockets to said gear mechanism of said rear wheel, said chain member being positioned on and engaging said sprockets and said gear mechanism;
  a plurality of idler gears for reducing slack in said chain member and ensuring continuous contact with each of said pedal sprockets, each of said idler gears being coupled to said lower portion of said frame and engaging said chain member, a first of said idler gears being positioned between said pedal sprockets, a second of said idler gears being positioned between said rear pedal sprocket and said gear mechanism of said rear wheel;
  a seat being coupled to said upper portion of said frame, said seat having a top surface and a bottom surface, said seat having a front edge and a rear edge, a first horizontal portion being positioned adjacent to said front edge, a second horizontal portion being positioned adjacent to said rear edge, said first portion being positioned lower relative to said second portion, said first portion being positioned substantially behind said front pedal sprocket such that a driver positioned on said first portion assumes a partially recumbent position while riding, said second portion being positioned substantially behind said rear pedal sprocket such that a rider positioned on said second portion assumes a partially recumbent position while riding;
  a post for supporting said first portion of said seat being attached to said bottom surface and being extendable into said frame on said upper portion such that said seat may be raised or lowered with respect to said frame, said post being positioned generally above said rear pedal sprocket;
  a plurality of telescoping rods for supporting said second portion of said seat having top ends and a bottom ends, each of said top ends being coupled to said bottom surface, each of said bottom ends being coupled to said frame proximate said rear axle; and
  a backrest for supporting the rider's back while riding being attached to and extending upwardly from said seat, said backrest being located adjacent to said rear edge of said seat, said backrest being generally slanted backwards.

* * * * *